US008165396B2

(12) United States Patent
Hsieh

(10) Patent No.: US 8,165,396 B2
(45) Date of Patent: Apr. 24, 2012

(54) DIGITAL IMAGE EDITING SYSTEM AND METHOD FOR COMBINING A FOREGROUND IMAGE WITH A BACKGROUND IMAGE

(75) Inventor: Chieh-Jung Hsieh, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 806 days.

(21) Appl. No.: 12/329,619

(22) Filed: Dec. 7, 2008

(65) Prior Publication Data

US 2010/0014754 A1 Jan. 21, 2010

(30) Foreign Application Priority Data

Jul. 15, 2008 (CN) .......................... 2008 1 0302744

(51) Int. Cl.
*G06K 9/00* (2006.01)
*H04N 5/228* (2006.01)
*G06K 9/34* (2006.01)
(52) U.S. Cl. ................... 382/167; 348/333.12
(58) Field of Classification Search .................. 382/162, 382/164, 165, 167, 254, 260–264, 274, 275; 345/214, 589; 348/254, 333.12, 584, 586, 348/592, 625, E5.024; 358/515, 518, 520, 358/523, 530
See application file for complete search history.

(56) References Cited

U.S. PATENT DOCUMENTS

| 4,833,524 | A | * | 5/1989 | Wischermann | 348/592 |
| 5,473,373 | A | * | 12/1995 | Hwung et al. | 348/254 |
| 5,490,218 | A | * | 2/1996 | Krug et al. | 382/100 |
| 6,188,444 | B1 | * | 2/2001 | Webb | 348/625 |
| 6,262,778 | B1 | * | 7/2001 | Nonweiler et al. | 348/586 |
| 6,348,953 | B1 | * | 2/2002 | Rybczynski | 348/584 |
| 6,701,009 | B1 | * | 3/2004 | Makoto et al. | 382/164 |
| 2010/0014754 | A1 | * | 1/2010 | Hsieh | 382/167 |

FOREIGN PATENT DOCUMENTS

CN 1745386 A 3/2006
TW 200605657 2/2006

OTHER PUBLICATIONS

Y. C. Liu, W. H. Chan, A., and Y. Q. Chen "Automatic White Balance for Digital Still Camera," IEEE Transactions on Consumer Electronics, vol. 41, No. 3, pp. 460-466, Aug. 1995.

* cited by examiner

*Primary Examiner* — Amir Alavi
(74) *Attorney, Agent, or Firm* — Altis Law Group, Inc.

(57) ABSTRACT

A digital image editing method includes: reading a foreground image and a background image, where the foreground image has a foreground portion; calculating three correction constants each of which is used to correct one of three components of the foreground portion of the foreground image using color information of the foreground and background images; correcting color of the foreground portion of the foreground image using the three correction constants; and pasting the foreground portion of the foreground image onto the background image.

18 Claims, 2 Drawing Sheets

DIGITAL IMAGE EDITING SYSTEM AND METHOD FOR COMBINING A FOREGROUND IMAGE WITH A BACKGROUND IMAGE

BACKGROUND

1. Technical Field

The present disclosure relates to a digital image editing system and a digital image editing method.

2. Description of the Related Art

In photo editing, it is common for photographers to replace a background of a photo. Accordingly, techniques have been developed to combine a foreground image with a background image. One of the shortcomings of current available combination techniques is that due to color differences between the foreground and background images, the foreground portion of the combined image seems abrupt, failing attempts to obtaining a high-quality combined image.

Therefore, it is desirable to provide a digital image editing system and a digital image editing method, which can overcome the above-mentioned problem.

DETAILED DESCRIPTION OF THE EMBODIMENTS

Embodiments of the present digital image editing system and digital image editing method will now be described in detail with references to the accompanying drawings.

Figure 1:
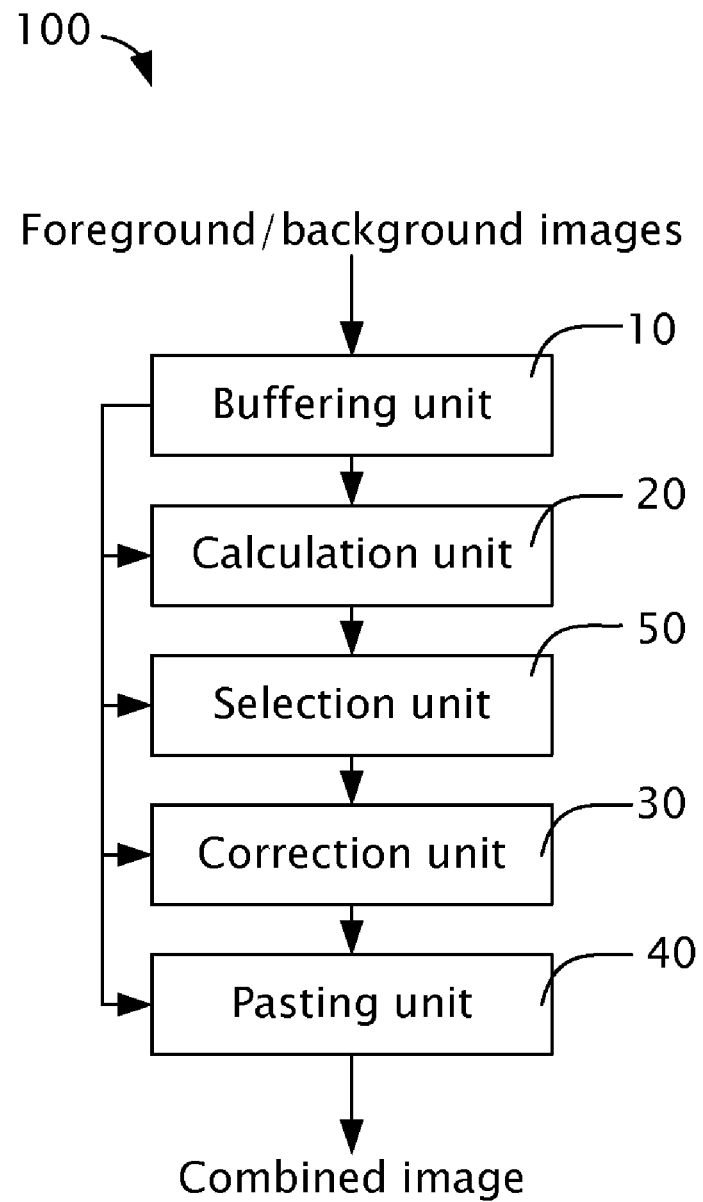
FIG. 1 is a block diagram of a digital image editing system, according to an exemplary embodiment.

Referring to FIG. 1, a digital image editing system 100, according to an exemplary embodiment, includes a buffering unit 10, a calculation unit 20, a correction unit 30, and a pasting unit 40. The buffering unit 10 is for buffering a foreground image such as a portrait, from which a portion will be cropped to use as a foreground portion, and a background image, such as a landscape, onto which the foreground portion will be pasted. The calculation unit 20 is configured for calculating three correction constants, each of which is used to correct one of three color components of the foreground portion of the image, using color information of the foreground and background images. The correction unit 30 is configured for correcting color of the foreground portion using the correction constants to eliminate differences in certain aspects of color between the foreground portion and the background image so that it appears that the subject of the foreground portion was imaged on location where the background image was captured. The pasting unit 40 is configured for pasting the foreground portion onto the background image.

In practice, the digital image editing system 100 can be installed on a computer such as a desktop or a laptop, or a digital image capture device such as a digital still camera, which includes a storage device (not shown). The foreground and background images are stored in the storage device. When the digital image editing system 100 is initialized, the foreground and background images are chosen, loaded into and buffered in the buffering unit 10. In other alternative embodiments, if the digital image editing system 100 is applied to the digital image capture device, the buffering unit 10 may also be electrically coupled to an image acquisition member of the digital image capture device (not shown) such as a charge coupled device (CCD) image sensor to receive a current image output by the image acquisition member as the foreground image. Thereby, the digital image capture device is equipped with a built-in image editing function.

Generally, each pixel of a color image can be coordinated in various three-dimensional color spaces, such as RGB, YUV or YCbCr, where R, G and B respectively represent red, green and blue components, Y represent luminance component, U and V are chrominance components, and Cb and Cr are blue-different and red-different chrominance components respectively. Component values (pixel values) of all pixels of the color image constitute the color information of the color image. The calculation unit 20 is configured for calculating each correction constant dedicated for a corresponding component using the color information of the foreground and background images. In this embodiment, the foreground and background images are encoded by YCbCr mode. Accordingly, the three correction constants are respectively for correcting Y, Cb and Cr components of the foreground portion. As mentioned above, correction of the foreground portion is to eliminate differences in certain aspects of color between the foreground and background images. There, the correction constants must relate to the differences of certain aspects of color, e.g., luminance and chrominance, between the foreground and background images. In this embodiment, the correction constants are calculated by the following formulas:

$$Yc = Yb/Yf; \quad (1)$$

$$Bc = Bb/Bf; \text{ and} \quad (2)$$

$$Rc = Rb/Rf, \quad (3)$$

where Yc, Bc and Rc are correction constants for Y, Cb and Cr components, respectively, Yb, Bb and Rb are averages of Y, Cb and Cr component values of the background image, and Yf, Bf and Rf are averages of Y, Cb and Cr component values of the foreground image. Of course, the formulas are not limited by this embodiment, but also can be variations thereof.

In addition to the buffering unit 10, the calculation unit 20, the correction unit 30, and the pasting unit 40, the digital image editing system 100 further includes a selection unit 50 in this embodiment. The selection unit 50 is configured for selecting the foreground portion of the foreground image in response to a user input. For example, the selection unit 50 is a touch screen. The foreground image is displayed by the touch screen to allow determination of selection. Accordingly, the foreground portion can be selected by the user based on the determination. Also, in some other alternative embodiments, the touch screen can be replaced with a pattern recognition device (not shown). The pattern recognition device is capable of recognize the foreground portion of the foreground image using various available image recognition techniques, such as nerve network, nerve network plus fast Fourier transform, fuzzy plus nerve network, RGB normalized color, fuzzy color, principle component analysis, and algorithm template, and accordingly determine the foreground portion.

The correction unit 30 corrects the foreground portion of the foreground image using the following formulas:

$$Py' = Py*Yc; \quad (4)$$

$$Pb' = Pb*Bc; \text{ and} \quad (5)$$

$$Pr' = Pr*Rc, \quad (6)$$

where Py, Pb and Pr are original Y, Cb and Cr component values of the foreground portion of the foreground image, and Py', Pb' and Pr' are corrected Y, Cb and Cr component values of the foreground portion of the foreground image. Of course, the formulas are not limited by this embodiment, but also can be variations thereof.

The pasting unit 40 selects a corresponding area of the background image and overwrites the corresponding area with the foreground portion. The corresponding area can be preset or determined by the selection unit 50.

It should be noted that many components of the digital image editing system 100, such as the calculation unit 20, the correction unit 30, the pasting unit 40, and the selection unit 50 can be individual electronic elements, or alternatively integrated into a central control unit. Furthermore, the components also can be implemented by software modules.

Figure 2:
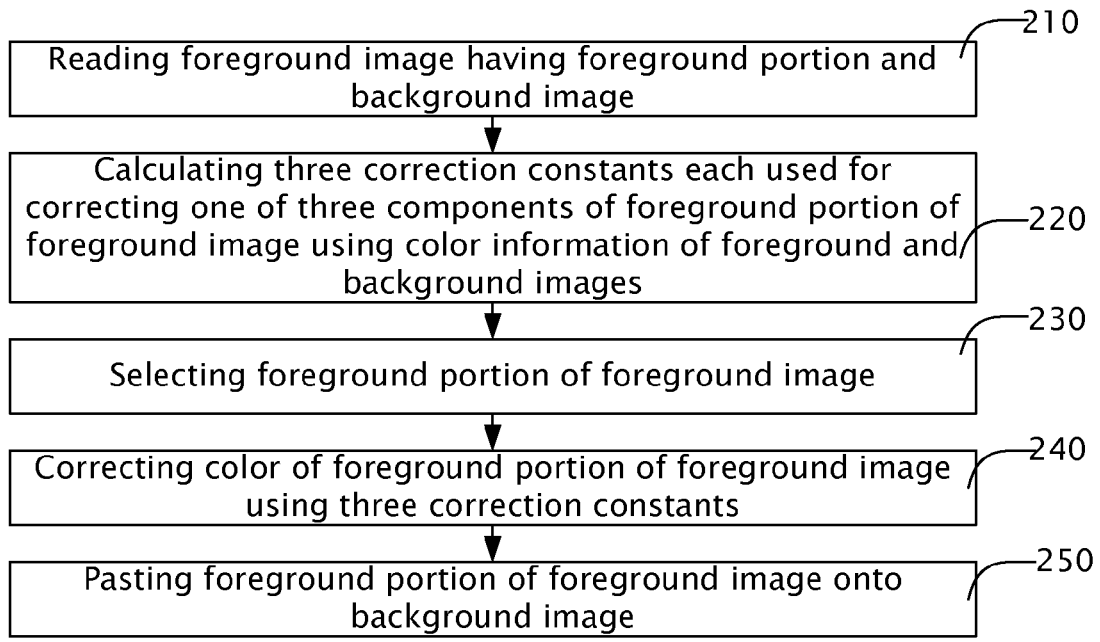
FIG. 2 is a flowchart of a digital image editing method, according to another exemplary embodiment.

Referring to FIG. 2, a digital image editing method in accordance with another exemplary embodiment can be implemented by the digital image editing system 10. The digital image editing system 10 is installed in a digital image capture device (not shown). The digital image editing method includes the following steps:

Step 210: reading a foreground image and a background image. The foreground image has a foreground portion. In an example, the foreground image is a portrait photo captured and transmitted from an image acquisition member of the digital image capture device immediately before this reading step. The background image is a landscape image chosen from a favorite library which is stored in a storage device of the digital image capture device before the reading step. Alternatively, the foreground image also can be read directly from the storage device.

Step 220: calculating three correction constants, each of which is used to correct one of three color components of the foreground portion of the foreground image, using color information of the foreground and background images. In this embodiment, it is assumed, as previously discussed, that the foreground and background images are encoded by YCbCr mode. Accordingly, the three correction constants are for correcting Y, Cb and Cr components of the foreground portion, and can be calculated by the following formulas:

$$Yc = Yb/Yf; \quad (1)$$

$$Bc = Bb/Bf; \text{ and} \quad (2)$$

$$Rc = Rb/Rf. \quad (3)$$

Step 230: selecting the foreground portion of the foreground image in response to a user input. For example, the foreground image is displayed by a touch screen of the digital image capture device, and then is selected in response to a user touch.

Step 240: correcting color of the foreground portion of the foreground image using the correction constants to eliminate differences in luminance and chrominance between the foreground portion of the foreground image and the background image. In detail, the foreground portion of the foreground image can be corrected using the following formulas:

$$Py' = Py*Yc; \quad (4)$$

$$Pb' = Pb*Bc; \text{ and} \quad (5)$$

$$Pr' = Pr*Rc, \quad (6)$$

Step 250: pasting the foreground portion of the foreground image onto the background image. In detail, before pasting, a corresponding area of the background image should be firstly determined. Then the corresponding area of the background image is then overwritten by the foreground portion. The corresponding area can be preset before the digital image editing method is carried out, or selected before the pasting step.

It will be understood that the above particular embodiments and methods are shown and described by way of illustration only. The principles and the features of the present invention may be employed in various and numerous embodiments thereof without departing from the scope of the invention as claimed. The above-described embodiments illustrate the scope of the invention but do not restrict the scope of the invention.

What is claimed is:

1. A digital image editing system comprising:
   a buffering unit for buffering a foreground image and a background image, the foreground image comprising a foreground portion;
   a calculation unit configured for calculating three correction constants, each of which is used to correct one of three color components of the foreground portion of the foreground image, using color information of the foreground and background images;
   a correction unit configured for correcting color of the foreground portion of the foreground image using the three correction constants to eliminate differences in certain aspects of color between the foreground portion of the foreground image and the background image; and
   a pasting unit configured for pasting the foreground portion of the foreground image onto the background image.

2. The digital image editing system as claimed in claim 1, wherein the foreground and background images are encoded by RGB mode, and the three correction constants are for correspondingly correcting R, G and B components of the foreground portion of the foreground image, where R, G and B respectively represent red, green and blue components of the foreground image.

3. The digital image editing system as claimed in claim 1, wherein the foreground and background images are encoded by YUV mode, and the three correction constants are for correspondingly correcting Y, U and V components of the foreground portion of the foreground image, where Y represents luminance component, and U and V are chrominance components.

4. The digital image editing system as claimed in claim 1, wherein the foreground and background images are encoded by YCbCr mode, and the three correction constants are for correspondingly correcting Y, Cb and Cr components of the foreground portion of the foreground image, where Y represents luminance component, and Cb and Cr are blue-different and red-different chrominance components respectively.

5. The digital image editing system as claimed in claim 4, wherein the three correction constants are calculated by the following formulas: Yc=Yb/Yf; Bc=Bb/Bf; and Rc=Rb/Rf, where Yc, Bc and Rc are correction constants for Y, Cb and Cr components, Yb, Bb and Rb are averages of Y, Cb and Cr component values of the background image, and Yf, Bf and Rf are averages of Y, Cb and Cr component values of the foreground image.

6. The digital image editing system as claimed in claim 5, wherein the correction unit corrects the foreground portion of the foreground image using the following formulas: Py'=Py*Yc; Pb'=Pb*Bc; and Pr'=Pr*Rc, where Py, Pb and Pr are original Y, Cb and Cr component values of the foreground portion of the foreground image, and Py', Pb' and Pr' are corrected Y, Cb and Cr component values of the foreground portion of the foreground image.

7. The digital image editing system as claimed in claim 1, wherein the pasting unit selects a corresponding area of the background image and overwrites the corresponding area with the foreground portion to paste the foreground portion of the foreground image onto the background image.

8. The digital image editing system as claimed in claim 1, further comprising a selection unit, the selection unit being configured for selecting the foreground portion of the foreground image in response to a user input.

9. The digital image editing system as claimed in claim 8, wherein the selection unit comprises a touch screen.

10. The digital image editing system as claimed in claim 8, wherein the selection unit comprises a pattern recognition device.

11. A digital image editing method comprising: using a processor to perform the steps of:
reading a foreground image and a background image, wherein the foreground image comprises a foreground portion;
calculating three correction constants, each of which is used to correct one of three color components of the foreground portion of the foreground image, using color information of the foreground and background images;
correcting color of the foreground portion of the foreground image using the correction constants to eliminate differences in certain aspects of color between the foreground portion of the foreground image and the background image; and
pasting the foreground portion of the foreground image onto the background image.

12. The digital image editing method as claimed in claim 11, wherein, in the reading step, the foreground is read directly from an image acquisition member.

13. The digital image editing combination method as claimed in claim 11, wherein, in the reading step, the foreground and background images are read directly from a storage device.

14. The digital image editing method as claimed in claim 11, wherein, in the calculating step, the foreground and background images are encoded by YCbCr mode, the three correction constants being for correcting Y, Cb and Cr components respectively of the foreground portion of the foreground image, where Y represents luminance component, and Cb and Cr are blue-different and red-different chrominance components respectively.

15. The digital image editing method as claimed in claim 14, wherein the three correction constants are calculated by the following formulas: $Yc=Yb/Yf$; $Bc=Bb/Bf$; and $Rc=Rb/Rf$, where Yc, Bc and Rc are correction constants for Y, Cb and Cr components, Yb, Bb and Rb are averages of Y, Cb and Cr component values of the background image, and Yf, Bf and Rf are averages of Y, Cb and Cr component values of the foreground image.

16. The digital image editing method as claimed in claim 15, wherein the foreground portion of the foreground image is corrected using the following formulas: $Py'=Py*Yc$; $Pb'=Pb*Bc$; and $Pr'=Pr*Rc$, where Py, Pb and Pr are original Y, Cb and Cr component values of the foreground portion of the foreground image, and Py', Pb' and Pr' are corrected Y, Cb and Cr component values of the foreground portion of the foreground image.

17. The digital image editing method as claimed in claim 11, further comprising:
selecting the foreground portion of the foreground image in response to a user input before the correcting step.

18. The digital image editing method as claimed in claim 11, wherein the pasting step comprises:
selecting an area of the background image corresponding to the foreground portion of the foreground image; and
overwriting the area of the background image with the foreground portion of the foreground image.

* * * * *